(12) United States Patent
Nishimura et al.

(10) Patent No.: US 10,220,883 B2
(45) Date of Patent: Mar. 5, 2019

(54) INSTRUMENT PANEL REINFORCEMENT

(71) Applicant: FUTABA INDUSTRIAL CO., LTD., Aichi (JP)

(72) Inventors: Ryuzo Nishimura, Aichi (JP); Yusuke Asai, Aichi (JP); Yoshinori Takeuchi, Aichi (JP); Kotaro Tsuda, Aichi (JP)

(73) Assignee: FUTABA INDUSTRIAL CO., LTD., Okazaki-Shi, Aichi (JP)

( * ) Notice: Subject to any disclaimer, the term of this patent is extended or adjusted under 35 U.S.C. 154(b) by 0 days.

(21) Appl. No.: 15/539,934

(22) PCT Filed: Dec. 3, 2015

(86) PCT No.: PCT/JP2015/083999
§ 371 (c)(1),
(2) Date: Jun. 26, 2017

(87) PCT Pub. No.: WO2016/104094
PCT Pub. Date: Jun. 30, 2016

(65) Prior Publication Data
US 2017/0349218 A1     Dec. 7, 2017

(30) Foreign Application Priority Data
Dec. 25, 2014  (JP) .................................. 2014-262901

(51) Int. Cl.
*B62D 25/14*       (2006.01)
(52) U.S. Cl.
CPC .................................. *B62D 25/145* (2013.01)
(58) Field of Classification Search
CPC .................................................. B62D 25/145
(Continued)

(56) References Cited

U.S. PATENT DOCUMENTS 7,407,221 B2 *  8/2008  Kring .................. B62D 25/145
                                                296/193.02
7,658,439 B2 *  2/2010  Meier .................. B62D 25/145
                                                296/193.02
(Continued)

FOREIGN PATENT DOCUMENTS

JP       H08166088 A     6/1996
JP       2007196875 A    8/2007
(Continued)

OTHER PUBLICATIONS

English translation of the International Search Report dated Feb. 4, 2016 from corresponding International Application No. PCT/JP2015/083999, filed Dec. 3, 2015.
(Continued)

*Primary Examiner* — Jason S Morrow
*Assistant Examiner* — E Turner Hicks
(74) *Attorney, Agent, or Firm* — David D. Brush; Westman, Champlin & Koehler, P.A.

(57) ABSTRACT

An instrument panel reinforcement in a tubular shape according to one aspect comprises a large-diameter portion that supports a steering column, a small-diameter portion that has an outer diameter smaller than an outer diameter of the large-diameter portion and has a thickness smaller than a thickness of the large-diameter portion, and an intermediate portion that is arranged between the large-diameter portion and the small-diameter portion. The intermediate portion is formed integrally with the large-diameter portion and has an outer diameter smaller than the outer diameter of the large-diameter portion.

7 Claims, 4 Drawing Sheets

(58) Field of Classification Search
USPC .............................. 296/193.02, 72, 192, 30
See application file for complete search history.

(56) References Cited

U.S. PATENT DOCUMENTS

| | | | | |
|---|---|---|---|---|
| 8,950,778 | B2* | 2/2015 | Fukushima | B62D 25/145 |
| | | | | 280/779 |
| 9,446,800 | B2* | 9/2016 | Davos | B62D 29/001 |
| 2007/0175375 | A1* | 8/2007 | Watanabe | B62D 25/145 |
| | | | | 114/144 R |
| 2009/0152898 | A1* | 6/2009 | Kawamura | F16L 13/147 |
| | | | | 296/193.02 |
| 2011/0254316 | A1* | 10/2011 | Watanabe | B62D 25/147 |
| | | | | 296/193.02 |
| 2013/0241235 | A1* | 9/2013 | Baudart | B62D 25/147 |
| | | | | 296/193.02 |
| 2016/0059900 | A1 | 3/2016 | Eshima et al. | |

FOREIGN PATENT DOCUMENTS

| | | | |
|---|---|---|---|
| JP | 2014091421 | A | 5/2014 |
| JP | 2014210548 | A | 11/2014 |

OTHER PUBLICATIONS

International Preliminary Report on Patentability dated Jul. 22, 2016 for corresponding International Application No. PCT/JP2015/083999, filed Dec. 3, 2015.
Written Opinion of the International Searching Authority dated Feb. 4, 2016 for corresponding International Application No. PCT/JP2015/083999, filed Dec. 3, 2015.
English translation of the International Preliminary Report on Patentability dated Jul. 22, 2016 for corresponding International Application No. PCT/JP2015/083999, filed Dec. 3, 2015.
English translation of the Chinese Office Action dated Aug. 3, 2018 for corresponding Chinese Application No. 201580070467.6.
English translation of the Japanese Notification of Reasons for Refusal dated Jun. 30, 2018 for corresponding Japanese Application No. 2014-262901.
English translation of the Japanese Notification of Reasons for Refusal dated Jun. 3, 2018 for corresponding Japanese Application No_ 2014-262901_ X.
English translation of the Japanese Notification of Reasons for Refusal dated Jul. 3, 2018 for corresponding Japanese Application No. 2014-262901.

* cited by examiner

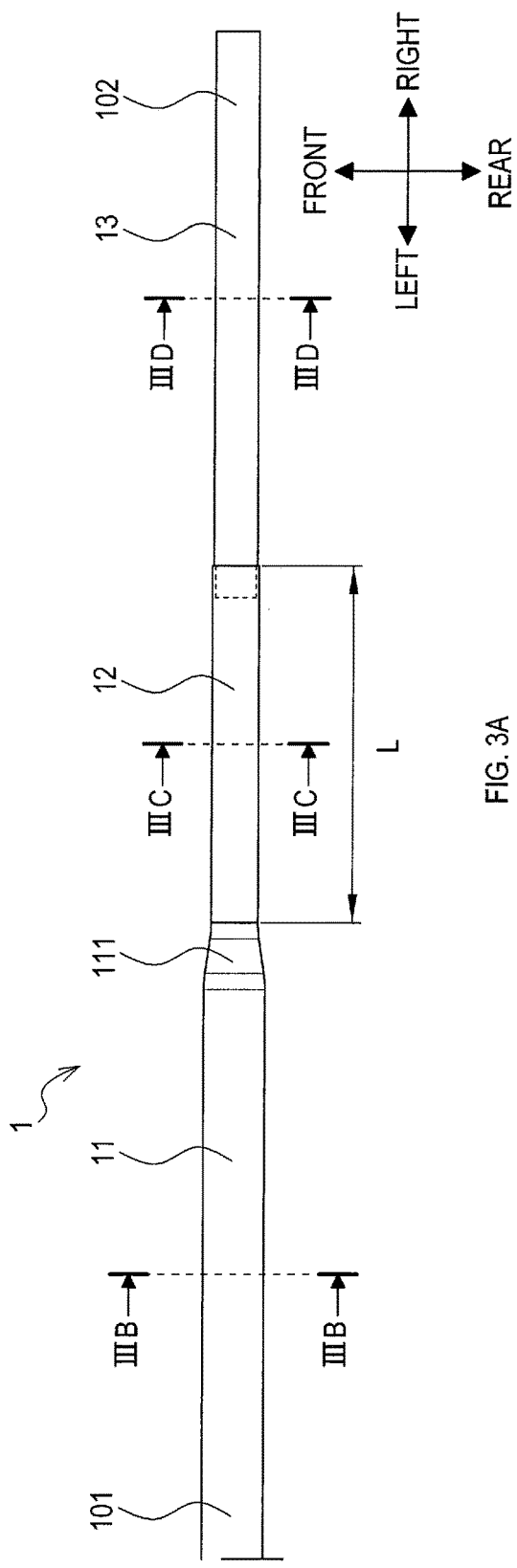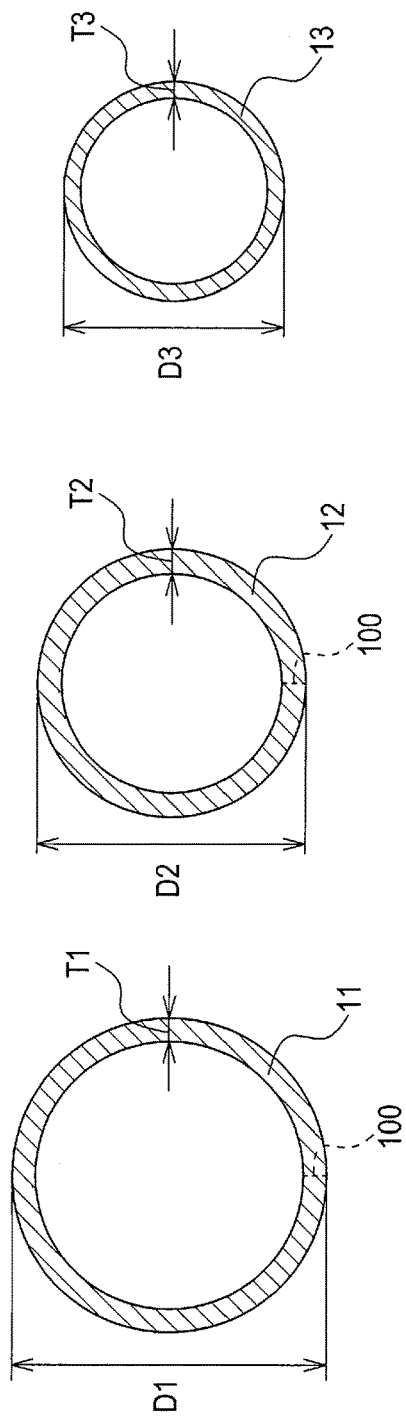
FIG. 3A
FIG. 3B
FIG. 3C
FIG. 3D

INSTRUMENT PANEL REINFORCEMENT

CROSS-REFERENCE TO RELATED APPLICATIONS

This Application is a Section 371 National Stage Application of International Application No. PCT/JP2015/083999, filed Dec. 3, 2015, published as WO 2016/104094 A1, not in English, which claims the benefit of Japanese Patent Application No. 2014-262901 filed on Dec. 25, 2014 with the Japan Patent Office the contents of which are hereby incorporated herein by reference in their entireties.

TECHNICAL FIELD

The present disclosure relates to an instrument panel reinforcement for a vehicle.

BACKGROUND ART

A tubular instrument panel reinforcement has conventionally been known that is provided inside the instrument panel of a vehicle along the width direction of the vehicle (see Patent Document 1). The instrument panel reinforcement comprises a large-diameter portion arranged on the driver side to support the steering column and a small-diameter portion arranged on the passenger side to support the air conditioner, etc. The large-diameter portion and the small-diameter portion are coupled together chiefly by fitting them together.

PRIOR ART DOCUMENTS

Patent Documents

Patent Document 1: Japanese Unexamined Patent Application Publication No. 2014-210548

SUMMARY OF THE INVENTION

Problems to be Solved by the Invention

In recent years, measures are required to be taken for small overlap crash tests. Specifically, in a driver-side small overlap crash (hereinafter, referred to simply as a small overlap crash), it is required to reduce the amount of displacement of the position of the steering wheel (hereinafter, referred to as the steering position) in the width direction of the vehicle in a small overlap crash so that the airbag in the steering wheel is operated in the correct direction toward the driver.

With a conventional instrument panel reinforcement, the driver-side front pillar enters the vehicle in case of a small overlap crash, thus applying a load onto an end of the driver side (the large-diameter portion) of the instrument panel reinforcement. At that moment, stress is concentrated in a fitted portion between the large-diameter portion and the small-diameter portion, where bending of the instrument panel reinforcement occurs. In other words, bending of the instrument panel reinforcement occurs at a point close to the steering position. This increases the deformed angle (the bent angle) of the instrument panel reinforcement, thus increasing the amount of displacement of the steering position in the width direction of the vehicle.

For example, with respect to the instrument panel reinforcement disclosed in the aforementioned Patent Document 1, measures are taken that provide, to a fitted portion between the large-diameter portion and the small-diameter portion where stress is concentrated, a reinforcement member (a reinforcement patch) to reinforce the fitted portion. However, this leads to an increased number of components, increased costs, increased man-hours, etc.

One aspect of the present disclosure provides an instrument panel reinforcement that improves crash performance in a small overlap crash, further increasing stiffness.

Means for Solving the Problems

One aspect of the present disclosure is an instrument panel reinforcement in a tubular shape, comprising a large-diameter portion that supports a steering column, a small-diameter portion that has an outer diameter smaller than an outer diameter of the large-diameter portion and has a thickness smaller than a thickness of the large-diameter portion, and an intermediate portion that is arranged between the large-diameter portion and the small-diameter portion. The intermediate portion is formed integrally with the large-diameter portion and has an outer diameter smaller than the outer diameter of the large-diameter portion.

The aforementioned instrument panel reinforcement comprises, between the large-diameter portion and the small-diameter portion, the intermediate portion that has a strength higher than a strength of the small-diameter portion. Thus, when a load is applied to an end of a driver side (the large-diameter portion) of the instrument panel reinforcement in a small overlap crash, stress is concentrated in a joint between the intermediate portion and the small-diameter portion, where bending of the instrument panel reinforcement occurs.

In other words, this allows the instrument panel reinforcement to bend at a point farther from a steering position than a conventional instrument panel reinforcement. This reduces a deformed angle (a bent angle) of the instrument panel reinforcement, thus reducing an amount of displacement of the steering position in a width direction of a vehicle. This results in improved crash performance in a small overlap crash.

Moreover, providing the intermediate portion having an outer diameter smaller than the outer diameter of the large-diameter portion inhibits weight increase and achieves reduced space, while improving crash performance in a small overlap crash. Providing the intermediate portion having a strength higher than the strength of the small-diameter portion increases stiffness (such as steering support stiffness) of the overall instrument panel reinforcement. Since no reinforcement member (reinforcement patch) is required to be provided as is conventionally required, effects of reducing the number of components, reducing costs, reducing man-hours, etc. are obtained, as compared with the case where a reinforcement member is provided.

According to one aspect of the present disclosure, it is possible, as described above, to provide the instrument panel reinforcement that reduces the amount of displacement of the steering position in the width direction of the vehicle in a small overlap crash to improve crash performance in a small overlap crash, further increasing stiffness.

In the aforementioned instrument panel reinforcement, the thickness of the intermediate portion may be larger than the thickness of the small-diameter portion. The outer diameter of the intermediate portion may be larger than the outer diameter of the small-diameter portion. In such cases, the effect of reducing the amount of displacement of the steering position in the width direction of the vehicle in a small overlap crash to improve small-overlap-crash performance is more completely obtained. This further improves the stiffness of the overall instrument panel reinforcement.

Further, the large-diameter portion and the intermediate portion may comprise a rolled pipe. When the intermediate portion is formed by, for example, pipe shrinking work to provide the large-diameter portion and the intermediate portion of different outer diameters formed integrally with each other, pipe cracking, buckling, etc. are more likely to occur and a longer work time is required as an axial length (in the width direction of the vehicle) of the intermediate portion is larger. This hinders ensuring a sufficient axial length for the intermediate portion.

If, however, the large-diameter portion and the intermediate portion comprise a rolled pipe formed by pipe roll forming, a sufficient axial length for the intermediate portion can be ensured and the axial length can be freely adjustable. Thus, this allows appropriate and free setting of the axial length of the intermediate portion in consideration of required performance, weight, etc. A rolled pipe is a pipe formed by rolling a plate member into a tubular shape, with one edge and the other edge of the plate member abutted and joined together by, for example, welding.

In the case of the large-diameter portion and the intermediate portion comprising a rolled pipe, the axial length of the intermediate portion is preferably 70 mm or greater. In this case, where it is necessary to ensure a sufficient axial length for the intermediate portion, it is extremely difficult to form the intermediate portion by pipe shrinking work. Accordingly, the above-described advantages of using pipe roll forming can be utilized.

BRIEF DESCRIPTION OF THE DRAWINGS

FIG. 3A is a plan view illustrating a configuration of the instrument panel reinforcement of Embodiment 1, FIG. 3B is a cross-sectional view taken along line IIIB-IIIB indicated by arrows in FIG. 3A, FIG. 3C is a cross-sectional view taken along line IIIC-IIIC indicated by arrows in FIG. 3A, and FIG. 3D is a cross-sectional view taken along line IIID-IIID indicated by arrows in FIG. 3A.

EXPLANATION OF REFERENCE NUMERALS

1 . . . instrument panel reinforcement, 11 . . . large-diameter portion, 12 . . . intermediate portion, 13 . . . small-diameter portion, 5 . . . steering column Mode for Carrying out the Invention Hereinafter, an embodiment of the present disclosure will be described with reference to the drawings.
(Embodiment 1)

Figure 1:
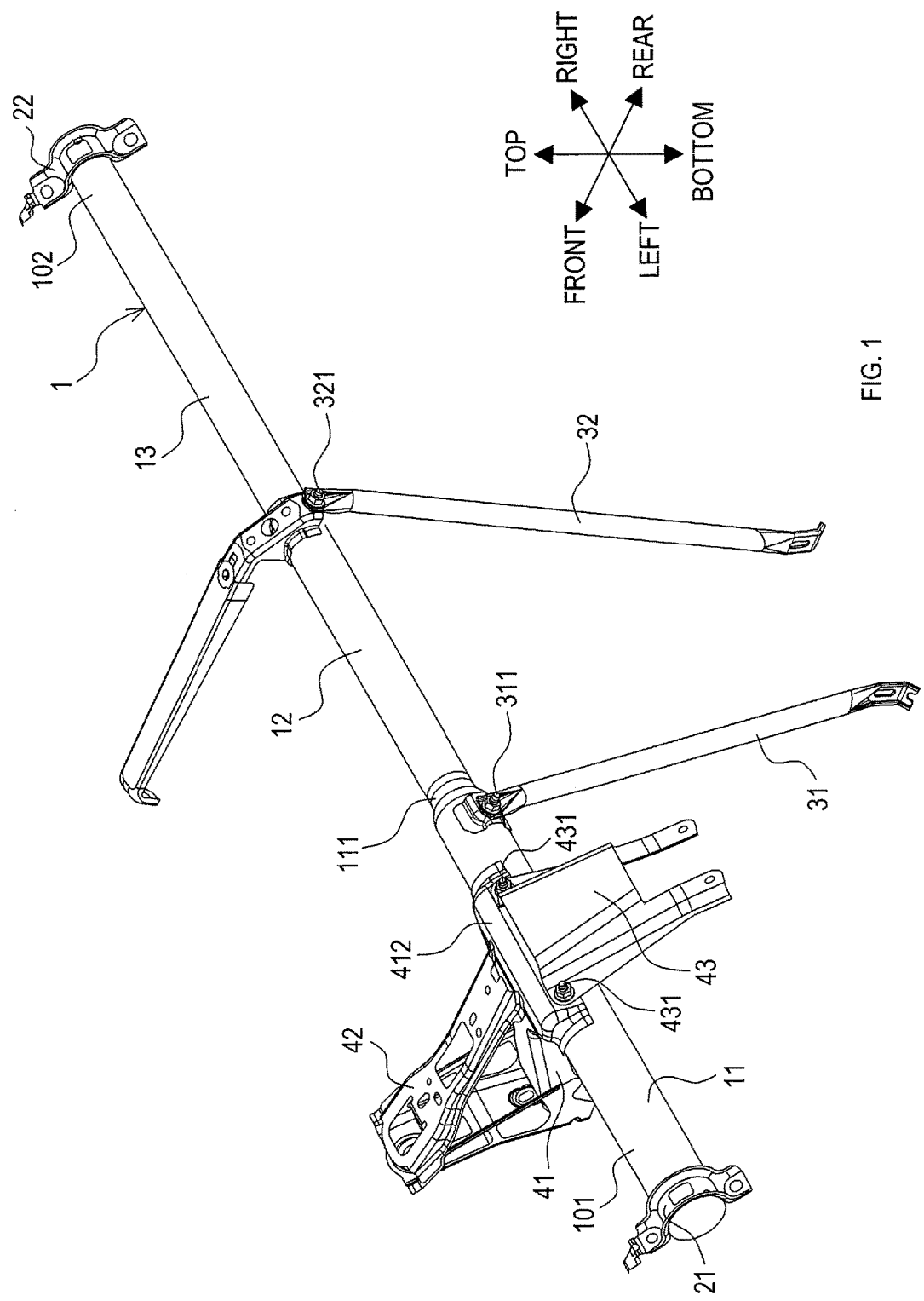
FIG. 1 is a perspective view illustrating a structure comprising an instrument panel reinforcement of Embodiment 1.
Figure 2:
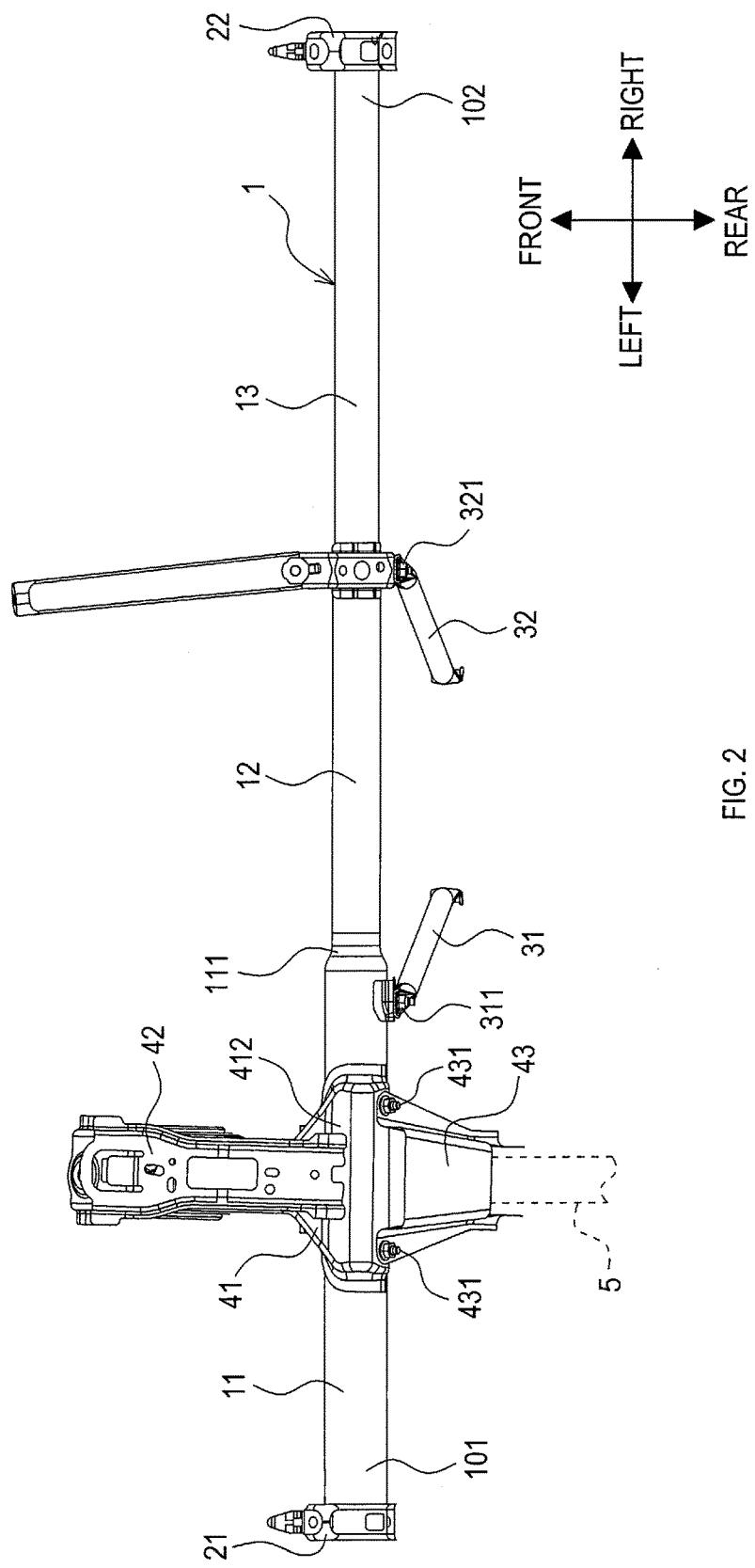
FIG. 2 is a plan view illustrating the structure comprising the instrument panel reinforcement of Embodiment 1.

As shown in FIG. 1 and FIG. 2, an instrument panel reinforcement 1 of Embodiment 1 is an instrument panel reinforcement in a tubular shape, provided inside an instrument panel (not shown) of a vehicle along a width direction of the vehicle.

The instrument panel reinforcement 1 comprises a large-diameter portion 11 that supports a steering column 5; a small-diameter portion 13 that has an outer diameter smaller than an outer diameter of the large-diameter portion 11 and has a thickness smaller than a thickness of the large-diameter portion 11; and an intermediate portion 12 arranged between the large-diameter portion 11 and the small-diameter portion 13. The intermediate portion 12 is formed integrally with the large-diameter portion 11 and has an outer diameter smaller than the outer diameter of the large-diameter portion 11. Hereinafter, details of the instrument panel reinforcement 1 will be described.

With respect to Embodiment 1, a front-rear direction, a left-right direction, and a top-bottom direction of the vehicle are indicated by respective arrows in FIG. 1 and FIG. 2. The front-rear direction is a direction aligned from the front to the rear (direction aligned from the rear to the front) of the vehicle. The left-right direction is a width direction of the vehicle. The top-bottom direction is a vertical direction (a height direction of the vehicle). The same applies to FIG. 3A and FIG. 4 described below.

As shown in FIG. 1 and FIG. 2, the instrument panel reinforcement 1 is made of, for example, steel and formed in a shape of an elongated circular tube. The instrument panel reinforcement 1 is provided inside the instrument panel (not shown) of the vehicle along the width direction of the vehicle (the left-right direction of the vehicle).

A left end (a driver-side end) 101 of the instrument panel reinforcement 1 is fixedly fastened to a vehicle body frame (not shown) via an attaching bracket 21 by fastening members (not shown). Similarly, a right end 102 of the instrument panel reinforcement 1 is fixedly fastened to the vehicle body frame (not shown) via an attaching bracket 22 by fastening members (not shown). Bolts and nuts, for example, may be used as fastening members. The same will apply hereinafter.

The instrument panel reinforcement 1 is provided with two floor braces 31, 32 facing bottom of the vehicle, each formed in a shape of an elongated circular tube. The instrument panel reinforcement 1 is supported by the two floor braces 31, 32 from bottom of the vehicle.

Specifically, a top end of the floor brace 31 is fixed to the instrument panel reinforcement 1 (the large-diameter portion 11) by a fastening member 311. A top end of the floor brace 32 is fixedly fastened to the instrument panel reinforcement 1 (the intermediate portion 12) by a fastening member 321. The top ends of the floor braces 31, 32 may be fixed to the instrument panel reinforcement 1 by, for example, welding. Bottom ends of the floor braces 31, 32 are fixedly fastened to a vehicle body floor (not shown) by respective fastening members (not shown).

The instrument panel reinforcement 1 (the large-diameter portion 11) is provided with a fixing bracket 41 facing front of the vehicle, for fixing a support member 43 described below. A rear end 412 of the fixing bracket 41 is joined to an outer peripheral surface of the instrument panel reinforcement 1 (the large-diameter portion 11) by, for example, welding.

A cowl-to-brace 42 is joined to the rear end 412 of the fixing bracket 41 by, for example, welding. The cowl-to-brace 42 is coupled not only to the rear end 412 of the fixing bracket 41 but also to a member (not shown) provided inside the instrument panel.

The support member 43 for supporting the steering column 5 on the instrument panel reinforcement 1 (the large-diameter portion 11) is fixed to the rear end 412 of the fixing bracket 41. Specifically, a top end of the support member 43 is fixedly fastened to the instrument panel reinforcement 1 (the large-diameter portion 11) by fastening members 431.

The steering column 5 is provided along the front-rear direction of the vehicle and coupled to a steering wheel (not shown). The steering column 5 is part of a configuration that transmits steering operation of the steering wheel to wheels (not shown). The steering wheel is a well-known member held and operated by a driver.

The steering column 5 is fixed to the support member 43 via a bracket (not shown). In other words, the steering column 5 is supported on the instrument panel reinforcement 1 (the large-diameter portion 11) via members including the support member 43, the fixing bracket 41, etc.

As shown in FIG. 3A, FIG. 3B, FIG. 3C, and FIG. 3D, the instrument panel reinforcement 1 comprises the large-diameter portion 11, the small-diameter portion 13, and the intermediate portion 12. The intermediate portion 12 is arranged between the large-diameter portion 11 and the small-diameter portion 13. The large-diameter portion 11, the intermediate portion 12, and the small-diameter portion 13 are arranged in this order from a driver side (from left in the width direction of the vehicle).

The large-diameter portion 11 is arranged on the driver side, comprising the left end 101 of the instrument panel reinforcement 1. As described above, the large-diameter portion 11 supports the steering column 5 via the members including the support member 43, the fixing bracket 41, etc.

The small-diameter portion 13 is arranged opposite to the driver side (on a passenger side), comprising the right end 102 of the instrument panel reinforcement 1. Outer diameter D3 of the small-diameter portion 13 is smaller than outer diameter D1 of the large-diameter portion 11. Thickness (plate thickness) T3 of the small-diameter portion 13 is smaller than thickness T1 of the large-diameter portion 11.

The intermediate portion 12 is formed integrally with the large-diameter portion 11. In Embodiment 1, the large-diameter portion 11 and the intermediate portion 12 of different diameters comprise a rolled pipe formed by pipe roll forming. A rolled pipe is a pipe formed by rolling a plate member into a tubular shape, with one edge and the other edge of the plate member abutted and joined together by, for example, welding. FIG. 3B and FIG. 3C show a welded portion 100 formed by abutting and welded together one edge and the other edge of a plate member rolled in a tubular shape. The large-diameter portion 11 comprises, at a right end thereof, a reduced-diameter portion 111 formed to be reduced in diameter toward the intermediate portion 12.

Thickness T2 of the intermediate portion 12 is larger than the thickness T3 of the small-diameter portion 13 and is identical with the thickness T1 of the large-diameter portion 11. Outer diameter D2 of the intermediate portion 12 is smaller than the outer diameter D1 of the large-diameter portion 11 and is larger than the outer diameter D3 of the small-diameter portion 13. Axial length L of the intermediate portion 12 is 70 mm or greater.

The large-diameter portion 11 and the intermediate portion 12 formed integrally together are coupled to the small-diameter portion 13 by, for example, welding. Specifically, part of a left end of the small-diameter portion 13 is inserted into a right end of the intermediate portion 12. The intermediate portion 12 and the small-diameter portion 13 are joined together, at a portion where the small-diameter portion 13 is inserted, by, for example, welding.

Functions and effects of the instrument panel reinforcement 1 of Embodiment 1 are described next.

The instrument panel reinforcement 1 of Embodiment 1 comprises, between the large-diameter portion 11 and the small-diameter portion 13, the intermediate portion 12 having a strength higher than a strength of the small-diameter portion 13. Thus, when a load is applied to the driver-side end (the left end 101) of the instrument panel reinforcement 1 in a small overlap crash, stress is concentrated in a joint between the intermediate portion 12 and the small-diameter portion 13, where bending of the instrument panel reinforcement 1 occurs.

In other words, this allows the instrument panel reinforcement 1 to bend at a point farther from the steering position than a conventional instrument panel reinforcement. This reduces a deformed angle (a bent angle) of the instrument panel reinforcement 1, thus reducing an amount of displacement of the steering position in the width direction of the vehicle. This results in improved crash performance in a small overlap crash.

Figure 4:
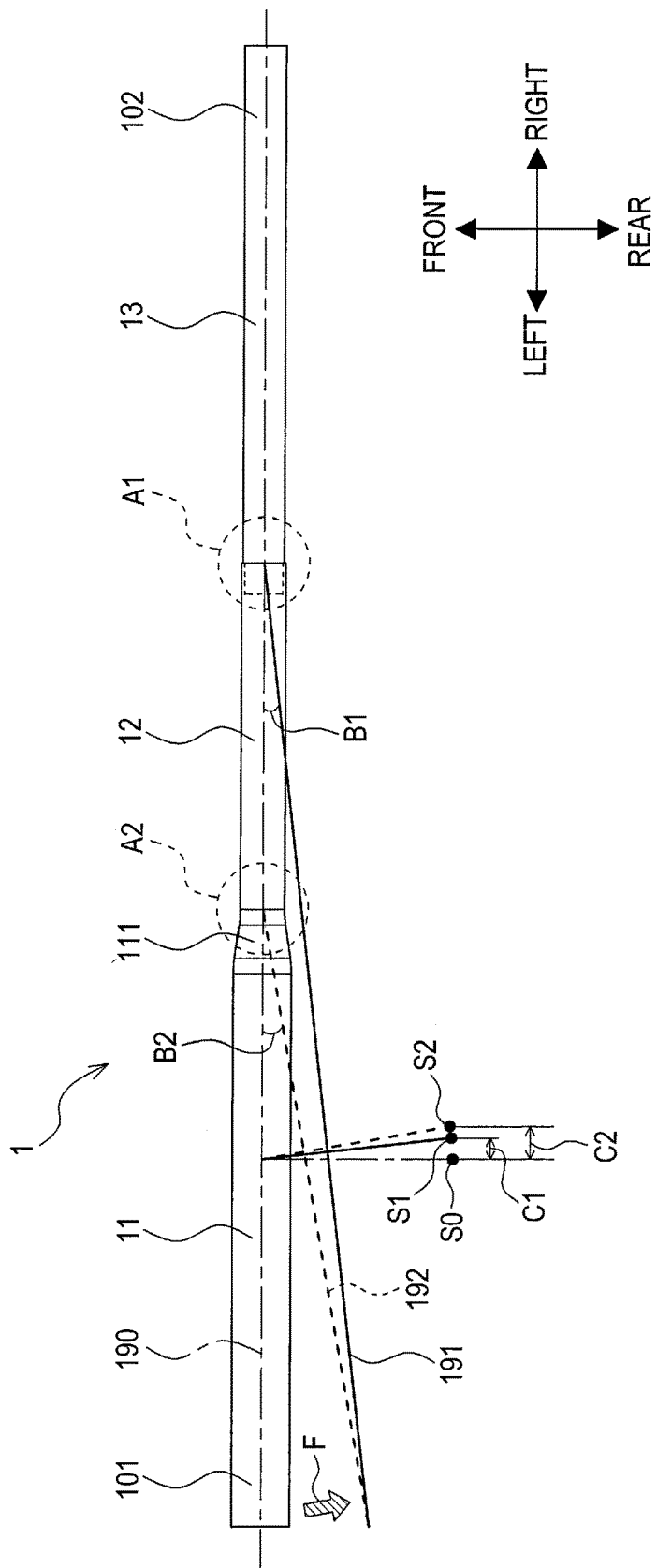
FIG. 4 is an explanatory diagram illustrating an amount of displacement of a steering position in a width direction of a vehicle in a small overlap crash.

To be more specific with respect to the instrument panel reinforcement 1 of Embodiment 1, when a load F is applied to the driver-side end (the left end 101) of the instrument panel reinforcement 1 in a small overlap crash, stress is concentrated in a joint A1 between the intermediate portion 12 and the small-diameter portion 13, where bending of the instrument panel reinforcement 1 occurs, as shown in FIG. 4. The deformed angle (the bent angle) of the instrument panel reinforcement 1 at that moment is defined as B1, while the steering position (a specified position of steering) is defined as S1. An original central axis 190 and a bent central axis 191 of the instrument panel reinforcement 1 are shown in FIG. 4.

Since a conventional instrument panel reinforcement is made of a large-diameter portion and a small-diameter portion, and does not comprise an intermediate portion (a portion corresponding to the intermediate portion 12 of Embodiment 1 is also included in the small-diameter portion), when a load F is applied to the driver-side end of the instrument panel reinforcement in a small overlap crash, stress is concentrated in a joint A2 between the large-diameter portion and the small-diameter portion, where bending of the instrument panel reinforcement occurs. The deformed angle (the bent angle) of the instrument panel reinforcement at that moment is defined as B2, while the steering position is defined as 52. A bent central axis 192 of the instrument panel reinforcement is shown in FIG. 4.

As can been seen also from that figure, a bending point (joint A1) in the instrument panel reinforcement 1 of Embodiment 1 is a point farther from an original steering position S0 than is a conventional bending point (joint A2). The deformed angle (the bent angle) B1 of the instrument panel reinforcement 1 is thus smaller than the conventional deformed angle B2. An amount C1 of displacement of the steering position in the width direction of the vehicle is smaller than a conventional amount C2 of displacement. Consequently, the instrument panel reinforcement 1 of Embodiment 1 offers improved crash performance in a small overlap crash, as compared with a conventional configuration.

Providing the intermediate portion 12 having an outer diameter smaller than the outer diameter of the large-diameter portion 11 inhibits weight increase and achieves reduced space, while improving crash performance in a small overlap crash. Providing the intermediate portion 12 having a strength higher than the strength of the small-diameter portion 13 increases stiffness (such as steering support stiffness) of the overall instrument panel reinforcement 1. Since no reinforcement member (reinforcement patch) is required to be provided as is conventionally required, effects of reducing the number of components, reducing costs, reducing man-hours, etc. are obtained, as compared with the case where a reinforcement member is provided.

Moreover, in Embodiment 1, the thickness of the intermediate portion 12 is larger than the thickness of the small-diameter portion 13. The outer diameter of the intermediate portion 12 is larger than the outer diameter of the small-diameter portion 13. Thus, the above-described effect of reducing the amount of displacement of the steering position in the width direction of the vehicle in a small overlap crash to improve small overlap crash performance is more completely obtained. This further improves the stiffness of the overall instrument panel reinforcement 1.

Further, the large-diameter portion 11 and the intermediate portion 12 comprise a rolled pipe formed by pipe roll forming. This ensures a sufficient axial length L for the intermediate portion 12, further allowing free adjustment of the axial length L, as compared with the case where the intermediate portion 12 is formed by, for example, pipe shrinking work. Thus, this allows appropriate and free setting of the axial length L of the intermediate portion 12 in consideration of required performance, weight, etc.

The axial length L of the intermediate portion 12 is 70 mm or greater. It is thus necessary to ensure a sufficient axial length L for the intermediate portion 12, and it is extremely difficult to form the intermediate portion 12 by pipe shrinking work. Accordingly, the above-described advantages of using pipe roll forming can be utilized.

According to Embodiment 1, it is possible, as described above, to provide the instrument panel reinforcement 1 that reduces the amount of displacement of the steering position in the width direction of the vehicle in a small overlap crash to improve crash performance in a small overlap crash, further increasing stiffness.

(Other Embodiments)

The present disclosure should not be limited to the above-described embodiment, and can be practiced in various modes without departing from the present disclosure.

(1) In Embodiment 1 described above, the outer diameter of the intermediate portion is larger than the outer diameter of the small-diameter portion. However, the outer diameter of the intermediate portion may be smaller than the outer diameter of the small-diameter portion, for example.

(2) In Embodiment 1 described above, the thickness of the intermediate portion is identical with the thickness of the large-diameter portion. Here, an identical (same) thickness means, for example, an approximately identical thickness including manufacturing errors, etc.

The invention claimed is:

1. An instrument panel reinforcement in a tubular shape, comprising:
   a large-diameter portion that supports a steering column;
   a small-diameter portion that has an outer diameter smaller than an outer diameter of the large-diameter portion and has a thickness smaller than a thickness of the large-diameter portion;
   an intermediate portion that is arranged between the large-diameter portion and the small-diameter portion; and
   a floor brace,
   wherein the intermediate portion is formed integrally with the large-diameter portion and has an outer diameter smaller than the outer diameter of the large-diameter portion,
   wherein the intermediate portion has a straight tubular shape and the large-diameter portion comprises, at an end of an intermediate-portion side thereof, a reduced-diameter portion that is reduced in diameter toward the intermediate portion,
   wherein the small-diameter portion is configured separately from the large-diameter portion and the intermediate portion and is joined to the intermediate portion, and
   wherein the floor brace is fixedly fastened to a right end of the large diameter portion, the vicinity of the reduced-diameter portion, or the intermediate portion.

2. The instrument panel reinforcement according to claim 1, wherein a thickness of the intermediate portion is larger than the thickness of the small-diameter portion.

3. The instrument panel reinforcement according to claim 1, wherein the outer diameter of the intermediate portion is larger than the outer diameter of the small-diameter portion.

4. The instrument panel reinforcement according to claim 1, wherein the large-diameter portion and the intermediate portion comprise a rolled pipe.

5. The instrument panel reinforcement according to claim 1, wherein the large-diameter portion comprises, at the end of the intermediate-portion side thereof, a brace attaching portion.

6. The instrument panel reinforcement according to claim 1, wherein the intermediate portion has a length that is 70 mm or greater.

7. The instrument panel reinforcement according to claim 1, further comprising:
   a first attaching bracket fixedly fastened to an end of the large-diameter portion opposite to the small-diameter portion, for attaching the instrument panel reinforcement to a vehicle body frame;
   a second attaching bracket fixedly fastened to an end of the small-diameter portion opposite to the large-diameter portion, for attaching the instrument panel reinforcement to the vehicle body frame;
   another floor brace fixedly fastened to the intermediate portion at an end thereof closer to the small diameter portion; and
   a steering column fixing bracket fixedly attached to an outer peripheral surface of the large-diameter portion.

* * * * *